(12) United States Patent
Berggren et al.

(10) Patent No.: US 12,022,376 B2
(45) Date of Patent: Jun. 25, 2024

(54) TERMINAL, NETWORK NODE, AND METHOD FOR DYNAMICALLY BARRING ACCESS TO A NETWORK

(71) Applicant: Sony Group Corporation, Tokyo (JP)

(72) Inventors: Anders Berggren, Lund (SE); Lars Nord, Lund (SE); Brian Martin, Weybridge (GB); Yuxin Wei, Weybridge (GB)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/339,863

(22) PCT Filed: Oct. 7, 2016

(86) PCT No.: PCT/EP2016/073996
§ 371 (c)(1),
(2) Date: Apr. 5, 2019

(87) PCT Pub. No.: WO2018/065065
PCT Pub. Date: Apr. 12, 2018

(65) Prior Publication Data
US 2019/0246332 A1    Aug. 8, 2019

(51) Int. Cl.
*H04W 48/02* (2009.01)
*H04W 8/24* (2009.01)
(Continued)

(52) U.S. Cl.
CPC ............. *H04W 48/02* (2013.01); *H04W 8/24* (2013.01); *H04W 24/08* (2013.01);
(Continued)

(58) Field of Classification Search
CPC ... H04L 29/06829; H04L 41/28; H04L 63/10; H04L 9/3226; H04L 9/088;
(Continued)

(56) References Cited

U.S. PATENT DOCUMENTS 9,742,756 B1 * 8/2017 Voutour ................. H04L 63/08
2006/0292292 A1 * 12/2006 Brightman ............. H04L 49/10
427/66
(Continued)

FOREIGN PATENT DOCUMENTS

CN    102300285 A    12/2011
CN    102740374 A    1/2012
(Continued)

OTHER PUBLICATIONS

International Search Report and Written Opinion from corresponding International Application No. PCT/EP2016/073996, mailed Jun. 8, 2017; 11 pages.
(Continued)

*Primary Examiner* — Salvador E Rivas
(74) *Attorney, Agent, or Firm* — Tucker Ellis LLP

(57) ABSTRACT

The UE(130) is configured to receive a control parameter (5013) from a network in a first connection with the network. The UE(130) is further configured to selectively bar access of the UE(130) to the network for a subsequent second connection based on the control parameter (5013).

19 Claims, 12 Drawing Sheets

(51) Int. Cl.
*H04W 24/08* (2009.01)
*H04W 28/02* (2009.01)
*H04W 48/16* (2009.01)
*H04W 76/11* (2018.01)
*H04L 12/28* (2006.01)
*H04L 41/28* (2022.01)
*H04W 12/08* (2021.01)

(52) U.S. Cl.
CPC ....... *H04W 28/0284* (2013.01); *H04W 48/16* (2013.01); *H04W 76/11* (2018.02); *H04L 12/2856* (2013.01); *H04L 41/28* (2013.01); *H04W 12/08* (2013.01)

(58) Field of Classification Search
CPC ............ H04L 12/1442; H04L 12/2464; H04L 41/5061; H04L 12/2856; H04L 29/06823; H04N 21/4753; H04W 76/00; H04W 76/10; H04W 28/0838; H04W 48/00; H04W 48/02; H04W 48/16; H04W 12/08; H01J 49/4205; H04B 10/85; H04B 10/0705
See application file for complete search history.

(56) References Cited

U.S. PATENT DOCUMENTS

| | | | | |
|---|---|---|---|---|
| 2007/0192606 A1* | 8/2007 | Yasukura | .................. | G06F 21/73 713/173 |
| 2008/0285492 A1* | 11/2008 | Vesterinen | .............. | H04W 4/50 370/310 |
| 2010/0229231 A1* | 9/2010 | Iwai | ................. | H04N 21/25875 726/28 |
| 2013/0232555 A1* | 9/2013 | Zhang | ................... | H04W 12/08 726/4 |
| 2014/0342691 A1* | 11/2014 | Kalavade | ................ | H04W 4/18 455/405 |
| 2015/0009887 A1* | 1/2015 | Chen | ..................... | H04W 48/12 370/312 |
| 2015/0200842 A1* | 7/2015 | Wang | ...................... | H04L 45/26 370/410 |
| 2016/0073349 A1* | 3/2016 | Mohan | .................. | H04W 76/14 455/552.1 |
| 2016/0088327 A1* | 3/2016 | Cronk | ................ | H04N 21/4753 725/30 |
| 2016/0278096 A1* | 9/2016 | Watfa | ...................... | H04W 4/14 |
| 2017/0034776 A1* | 2/2017 | Hou | ...................... | H04W 48/20 |
| 2017/0046529 A1* | 2/2017 | Avi-Dan | ............... | H04L 63/102 |
| 2017/0070545 A1* | 3/2017 | Levine | .................. | H04L 65/611 |
| 2018/0220397 A1* | 8/2018 | Paredes Cabrera | ... | H04W 72/23 |

FOREIGN PATENT DOCUMENTS

| | | |
|---|---|---|
| CN | 105556994 A | 5/2016 |
| CN | 105792382 A | 7/2016 |
| GB | 2443233 A | 4/2008 |
| JP | 2006100301 A | 4/2006 |
| JP | 2006191081 A | 7/2006 |
| WO | 2013025148 A1 | 2/2013 |
| WO | 2013141600 A1 | 9/2013 |
| WO | 2014053170 A1 | 4/2014 |
| WO | 2016027133 A1 | 2/2016 |

OTHER PUBLICATIONS

LG Electronics "Clarification on Access control for REAR", 3GPP TSG-SA WGI #75, S1-162275; San Francisco, Aug. 22-26, 2016; 7 pages.
Office Action from corresponding Chinese Application No. 201680089772.4 mailed on Apr. 23, 2021.
Notice to Grant Patent Right in the corresponding CN Application No. 201680089772.4 mailed Sep. 23, 2021.

* cited by examiner

TERMINAL, NETWORK NODE, AND METHOD FOR DYNAMICALLY BARRING ACCESS TO A NETWORK

TECHNICAL FIELD

The invention generally relates to barring access of a terminal to a network. The invention specifically relates to barring the access of the terminal to the network based on a control parameter previously received from the network.

BACKGROUND

In wireless networks, access class barring (ACB) is a concept to avoid traffic overload and to prioritize the connection of a first terminal over the connections of a second terminal.

For example, according to the Third Generation Partnership Project (3GPP) Technical Specification (TS) 22.011 V 14.0.0 (2015-09): section 4 "Access Control", techniques are known to prevent a terminal (sometimes referred to as user equipment, UE) from making access attempts to a 3GPP Long Term Evolution (LTE) cellular network.

Such techniques face certain restrictions and drawbacks. ACB according to reference implementations typically attempts to reduce traffic within a radio access network (RAN) of the network by using a predefined/static statistical technique. For example, ACB is determined based on a fixedly assigned association of a given subscriber with a randomly allocated mobile population (access class, AC). Based on a barring policy communicated from the network to the UE, certain access classes can be subject to ACB. It has been observed that it can be difficult to tailor ACB based on different needs of different operators.

SUMMARY

Therefore, a need exists for advanced techniques of ACB. In particular, a need exists for such techniques which overcome or mitigate at least some of the above-identified restrictions and drawbacks.

This need is met by the features of the independent claims. The dependent claims define embodiments.

In one example, a UE is configured to receive, via a wireless link, a control parameter from a network in a first connection with the network. The UE is further configured to selectively bar access of the UE to the network for a subsequent second connection based on the control parameter.

According to an example, a method includes a terminal receiving a control parameter from a network in a first connection between the terminal and the network. The method further includes the terminal selectively barring access to the network for a subsequent second connection between the terminal and the network based on the control parameter.

According to an example, a computer program includes program code that can be executed by at least one processor. Executing the program code causes the at least one processor performing a method. The method includes a terminal receiving a control parameter from a network in a first connection between the terminal and the network. The method further includes the terminal selectively barring access to the network for a subsequent second connection between the terminal and the network based on the control parameter.

According to an example, a computer program product includes program code that can be executed by at least one processor. Executing the program code causes the at least one processor performing a method. The method includes a terminal receiving a control parameter from a network in a first connection between the terminal and the network. The method further includes the terminal selectively barring access to the network for a subsequent second connection between the terminal and the network based on the control parameter.

According to an example, a network node of a network is configured to send, via a wireless link, a control parameter to a UE in a first connection with the UE. The control parameter enables access barring by the UE to the network for a subsequent second connection.

According to an example, a method includes sending a control parameter to a UE in a first connection with the UE. The control parameter enables access barring by the UE to the network for a subsequent second connection.

According to an example, a computer program includes program code that can be executed by at least one processor. Executing the program code by the at least one processor causes the at least one processor performing a method. The method includes sending a control parameter to a UE in a first connection with the UE. The control parameter enables access barring by the UE to the network for a subsequent second connection.

According to an example, the computer program product includes program code that can be executed by at least one processor. Executing the program code by the at least one processor causes the at least one processor performing a method. The method includes sending a control parameter to a UE in a first connection with the UE. The control parameter enables access barring by the UE to the network for a subsequent second connection.

According to an example, a system includes a terminal and a network node. The network node is configured to send, via a wireless link, a control parameter to the terminal in a first connection between the terminal and the network node. The terminal is configured to selectively bar access of the terminal to the network for a subsequent second connection based on the control parameter.

The various examples described above can be combined with each other in further examples. For example, it is possible that a network node and a UE according to various examples described above are interrelated constituents of a system.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
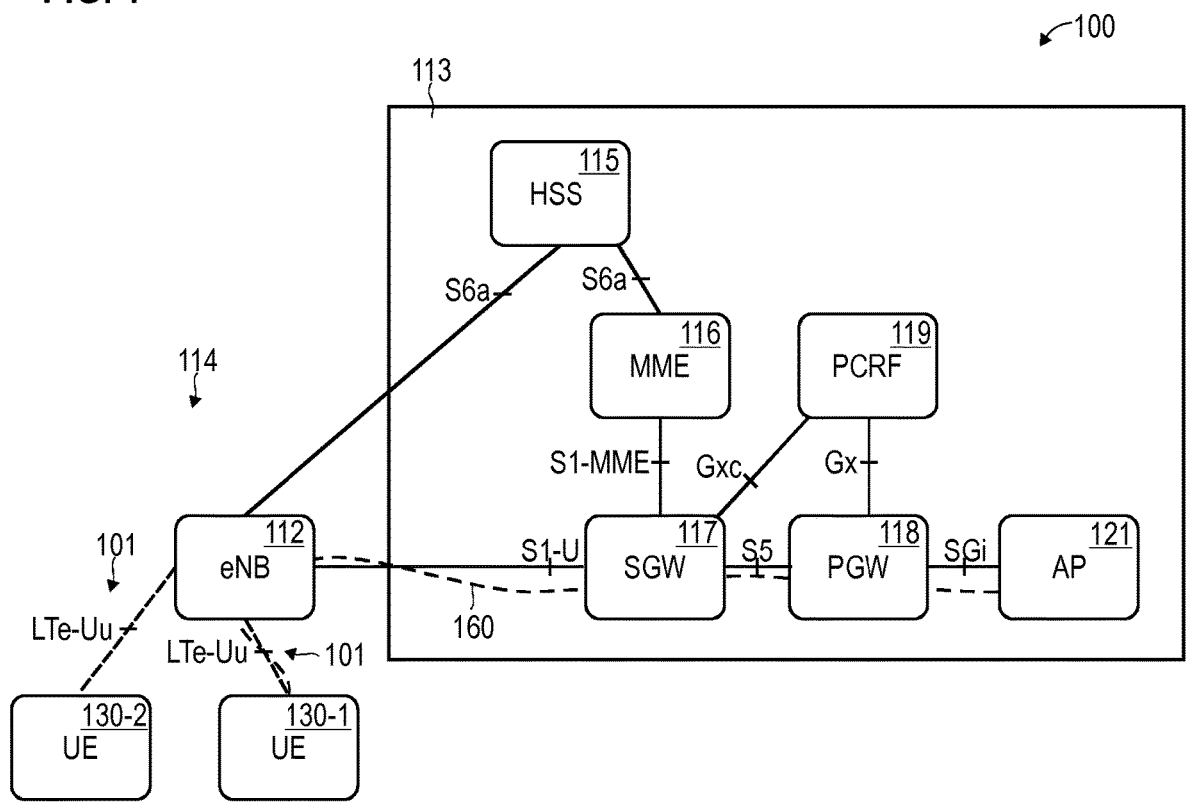
FIG. 1 schematically illustrates a network according to various embodiments, the network comprising a core network and a RAN for providing access to a UE.

In the following, embodiments of the invention will be described in detail with reference to the accompanying drawings. The following description of embodiments is not to be taken in a limiting sense. The scope of the invention is not intended to be limited by the embodiments described hereinafter or by the drawings which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. Functional blocks may be implemented in hardware, firmware, software, or a combination thereof.

Hereinafter, techniques are described with respect to barring access of a UE to a network. Barring access can relate to preventing initialization of a connection between the UE and the network. Barring access may facilitate reduction of overload of the RAN of the network. For example, access barring may be helpful in case of an overload situation like emergency or congestion. Typically, access barring is implemented by logic residing in the UE. Thereby, signaling on the wireless link—e.g., as part of a random access technique—can be reduced: this may be due to the UE preemptively barring access before an uplink control message is transmitted for seeking access to the network. I.e., the network may not be aware of the access barring being executed by a certain UE, because it is not informed accordingly.

According to some examples, the access barring is implemented on a per-UE basis. I.e., it may be possible to control access barring individually for each UE. Alternatively or additionally, various techniques described herein may be employed for multiple UEs grouped into a class. This is sometimes referred to as ACB. ACB is a special form of access barring, ACB not being implemented on a per-UE basis but using groups/classes of UEs.

For example, multiple UEs grouped into the same class may correspond to each other with respect to one or more device properties. Example device properties include the communication capability of the UE, such as narrowband or wideband communication, low latency services, etc.; the device type of the UE such as Narrowband Internet of Things (NB-IoT) devices and Machine Type Communication (MTC) devices, etc.; the network slices associated with the UEs; an access class of the UE, e.g., hardcoded into the subscriber identity module (SIM); and an operator of the subscriber associated with the UE. The access barring may be based on a control parameter. The control parameter may be provided from the network to the UE. Because the control parameter is not fixedly associated with the UE—e.g., hardcoded into the SIM of the subscriber associated with the UE—it is possible to dynamically assign different control parameters to one and the same UE. Thereby, it is possible to dynamically change access barring for a UE.

Such dynamic access barring may facilitate various effects. For example, it may be possible to implement the access barring with a fine level of granularity. If compared to reference implementations in which typically on the order of ten access classes are available, it may be possible to assign control parameters to multiple UEs which enables to discriminate at a higher resolution between different UEs. Furthermore, it may be possible to flexibly define classes of UEs for ACB. For example, classes may be formed with respect to different kinds and types of device properties. Then, it may be possible to tailor the ACB. One example includes correlating ACB with the concept of network slicing (sometimes also referred to network partitioning).

The various examples described herein can be applied to network slices. An example of the concepts of slicing the network is described in 3GPP Technical Request (TR) 23.799. A network slice typically corresponds to a logical partition of the network. Typically, network slicing is implemented for the core network. Alternatively or additionally, it is also possible to implement network slicing for the RAN. By slicing the network, an operator may provide dedicated network functionality according to the needs of the user. For example, a certain network slice may be optimized for delivering a specific service. For example, a network slice may serve a specific business case purpose. For example, by slicing the network, an operator may provide a low-cost network slice offering limited performance. Network slicing can also be implemented with respect to certain device properties such as device types. For example, IoT and/or MTC devices may be assigned to one or more dedicated network slices.

In various examples, it is possible that a barring policy takes into account or distinguishes between different network slices. For example, it would be possible that by relying on respectively defined control parameters, the access of UEs associated with a certain network slice is barred, but the access of further UEs associated with a further network slice is not barred. As such, the control parameters may be assigned according to the network slices associated with the UEs.

FIG. 1 illustrates aspects with respect to the architecture of the network 100. The network 100 according to the example of FIG. 1 implements the 3GPP LTE architecture. According to 3GPP LTE, a wireless link 101 is defined in a RAN 114. The wireless link 101 is defined between a base station in the form of an evolved node B (eNB) 112 and one or more UEs 130-1, 130-2. The wireless link 101 may implement one or more channels such as payload channels and/or control channels.

Furthermore, the network 100 includes a core network 113. The core network 113 is in communication with the RAN 114. The core network 113 includes a control layer and a data layer. The control layer includes control nodes such as the home subscriber server (HSS) 115, the mobility management entity (MME) 116, and the policy and charging rules function (PCRF) 119. The data layer includes gateway nodes such as the serving gateway (SGW) 117 and the packet data network gateway (PGW) 118.

A data connection 160 is established between the UE 130-1 via the RAN 114 and the data layer of the core network 113 and towards an access point 121. For example, a connection with the Internet or another packet data network can be established via the access point 121.

The general functioning and purpose of the network nodes 115-119, 121 of the core network 113 is well known in the art such that a detailed description is not required in this context.

The illustration of the network 100 in the 3GPP LTE framework is for exemplary purposes only. Similar techniques can be readily applied to various kinds of 3GPP-specified architectures, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA). For example, the techniques described herein may be applied to the 3GPP eNB-IoT or MTC systems or 3GPP New Radio (NR) systems. See, for example, 3GPP RP-161321 and RP-161324. Furthermore, respective techniques may be readily applied to various kinds of non-3GPP-specified networks, such as Bluetooth, satellite networks, IEEE 802.11x Wi-Fi technology, etc.

Figure 2:
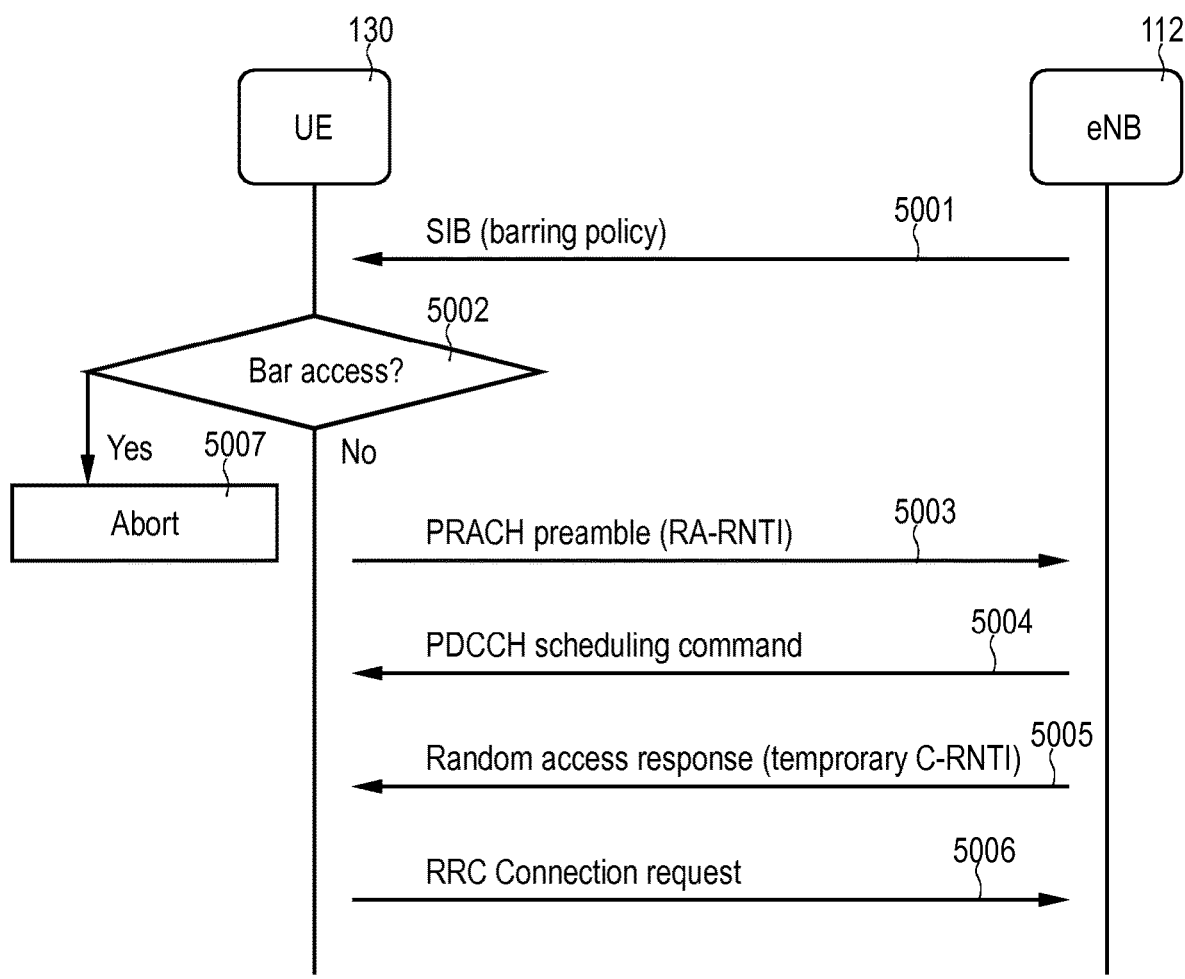
FIG. 2 is a signaling diagram schematically illustrating barring access of the UE to the network based on a barring policy according to various embodiments.

FIG. 2 illustrates aspects with respect to access barring of a UE 130. The UE 130 seeks access to the network 100 via the eNB 112. The eNB 112 periodically transmits system information blocks (SIB), e.g., SIB 2. In the example of FIG. 2, an SIB 5001 is transmitted and received by the UE 130. It is not required that the UE 130 is already connected to the network 100 in order to receive the SIB 5001.

The SIB 5001 is indicative of a barring policy. The UE 130 is then configured to bar access based on the barring policy 5002.

For example, at 5002 it is possible to compare a control parameter with the barring policy. For example, the barring policy may explicitly or implicitly indicate whether the control parameter should result in barring access or should not result in barring access. Such a comparison between the barring policy and the control parameter may include a random contribution. For example, the barring policy may be indicative of a probability with which a certain control parameter results in barring access or results in not barring access. The barring policy may be seen as a parameterized rule defining access barring for the available control parameters.

For example, if in block 5002 it is judged that access of the UE 130 to the network 100 should not be barred, initialization of a connection of the UE 130 with the network commences—otherwise, the connection attempt is already aborted, 5007.

As such, in the example of FIG. 2, the UE 130 in 5007 bars the access prior to initialization of the connection with the network. When executing 5007, the UE 130 may be in a disconnected state or idle state: here, for example, uplink data transmission may not be possible towards the network 100. There may be no established channels on the wireless link 101. The data connection 160 may not be set up. A random access procedure may be avoided. This may reduce network load, because the barring check is implemented by the UE.

For example, in 5007 a back off timer may be initialized. The back off timer may specify the time duration until the next access attempt. The back off timer may or may not be defined by the barring policy.

If at block 5002 it is judged that access is not to be barred: The messages 5003-5006 are then used in order to initialize the connection between the UE 130 and the eNB 112.

For example, first, the UE 130 sends a randomly selected random access preamble sequence 5003. For example, an identifier of the UE 130 called RA-RNTI can be implicitly specified by the timing of the transmission of the preamble 5003.

Next, the eNB 112 sends a physical downlink control channel (PDCCH) scheduling command 5004 to the UE 130 to assign certain resources on the wireless link 101.

Furthermore, the eNB 112 transmits a random access response 5005. The response 5005 is indicative of a temporary identity assigned to the UE 130, the so-called Cell Radio Network Temporary Identity (C-RNTI). During the validity of the C-RNTI, this identity is uniquely associated with the UE 130.

Then, based on the messages 5004 and/or 5005, the UE 130 sends a Radio Resource Control (RRC) connection request 5006 to the network. The RRC connection request 5006 facilitates set up of the data connection 160 between the UE 130 and the network 112.

Figure 3:
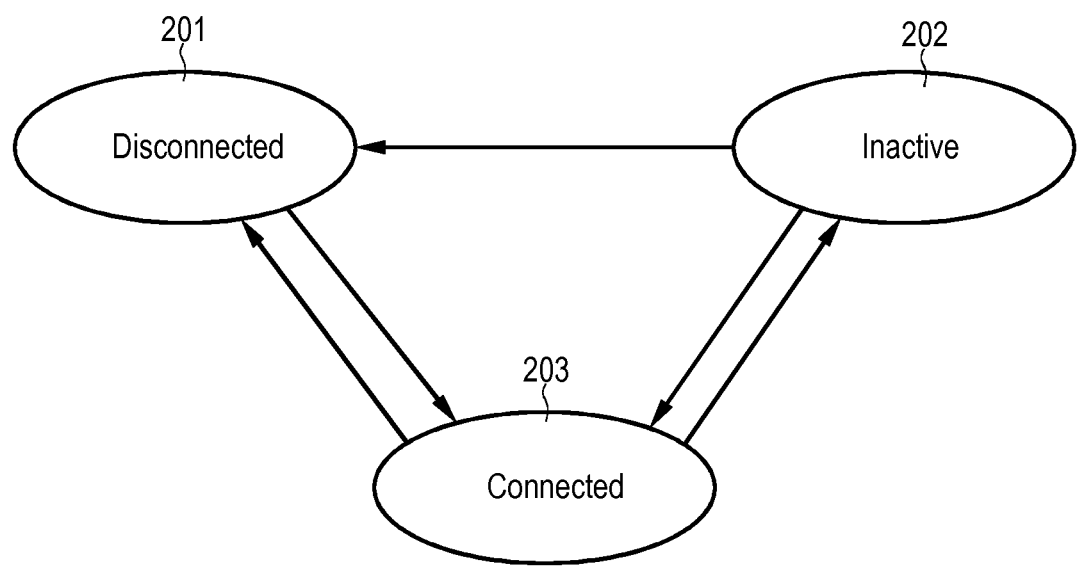
FIG. 3 is a state diagram schematically illustrating different states of a connection between the UE and the network according to various embodiments.

FIG. 3 illustrates aspects with respect to the connection between the UE 130 and the network 100. In the example of FIG. 3, the connection between the UE 130 and the network 100 is defined with respect to certain connection states 201-203. For example, in a connection state 201, the UE 130 is fully disconnected from the network 100. As such, the network 100 may not be aware of a location of the UE 130. Transmission of uplink data may not be possible. Transmission of dedicated downlink data to the UE 130 may not be possible.

Upon initializing the connection with the network 100, the UE 130 transitions into a connected state 203. During the connected state 203, it is possible that one or more bearers for communication of data have been established. For example, the data connection 160 may be established. During the connected state 203, an Internet Protocol (IP) address may be assigned to the UE 130. During the connected state 203, it may be possible to transmit uplink control data and/or downlink control data on the wireless link 101 between the network 100 and the UE 130. During the connected state 203, it may be possible to repeatedly ping the UE 130 to obtain updates on the device properties.

In FIG. 3, a further state 202 is illustrated. The state 202 relates to an inactive state 202. Sometimes, the inactive state 202 is also referred to as disconnected connected state or idle state. For example, in the inactive state 202, communication of payload data may not be possible between the UE 130 and the network 100. For example, in the inactive state 202, the network 100 may hold no valid location or routing information for the UE 130. For example, in the inactive state 202, the UE 130 may not be reachable, because the particular cell of the network 100 serving the UE 130 may be unknown. However, it is also possible that in the inactive state 202 some context information on the UE 130 is stored in the network. This may facilitate a simple initialization of a connection when switching back to the connected state 203. In some examples, it is also possible that the inactive state 202 is associated with periodic tracking area updates of the UE 130. For example, during the inactive state 202 the UE may periodically respond to paging attempts of the network 100. Sometimes, the inactive state 202 is referred to as ECM-idle in the 3GPP LTE scenario.

In the various examples described herein, a connection may refer to operation of the UE 130 in the connected state 203. In the various examples described herein, initialization of the connection may refer to switching from the disconnected state 201— e.g., EMM deregistered in the 3GPP LTE framework—to the connected state 203—e.g., ECM connected and RRC connected in the 3GPP LTE framework—and/or switching from the inactive state 202—e.g., (ECM idle and RRC idle) or (ECM connected and RRC inactive) in the 3GPP LTE framework—to the connected state 203. As such, it is possible that access barring is performed in the disconnected state 201 and/or the idle state 202, i.e., prior to initialization of the connection according to the connected state 203. This may reduce network load, because the network is not involved in the access barring.

Figure 4:
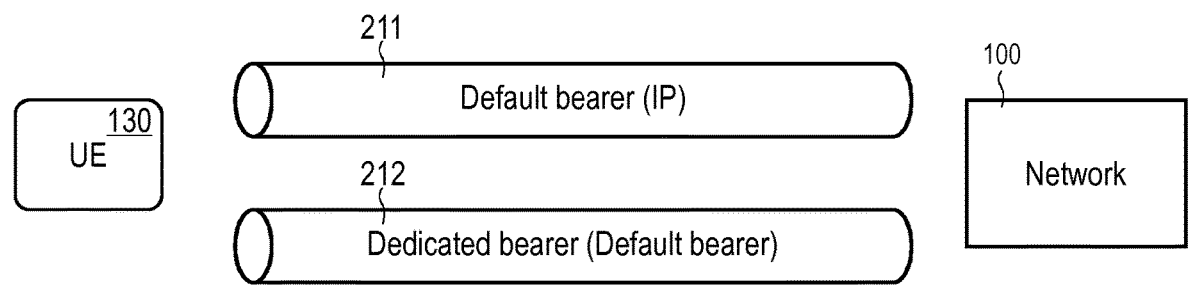
FIG. 4 schematically illustrates a default bearer and a dedicated bearer between the UE and the network according to various embodiments, the bearers implementing connections between the UE and the network.

FIG. 4 illustrates aspects with respect to the connection between the UE 130 and the network 100. In particular, FIG. 4 illustrates aspects with respect to bearers 211, 212 established between the UE 130 and the network 100. For examples, the bearers 211, 212 may implement the data connection 160.

In the example of FIG. 4, a connection between the UE 130 and the network 100 is implemented by a default bearer 211. The default bearer is associated with an IP address of the UE 130. It is possible to transmit uplink payload data and/or downlink payload data via the default bearer 211.

Additionally, the connection between the UE 130 and the network 100 includes a dedicated bearer 212. The dedicated bearer 212 is dependent on the default bearer 211. As such, the dedicated bearer is specified by an identity of the default bearer 211. For example, uplink payload data and/or downlink payload data of a specific service can be transmitted via the dedicated bearer 212. There may be no additional IP address assigned for the dedicated bearer 212.

According to the various examples herein, access barring can be implemented with respect to a connection implemented by the default bearer 211 and/or the dedicated bearer 212. Thus, access barring may take place prior to initialization of the default bearer 211 and/or the dedicated bearer 212.

Figure 5:
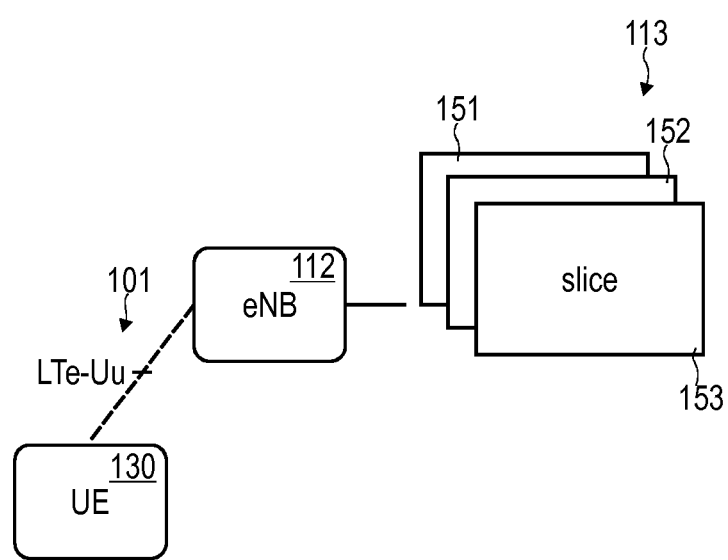
FIG. 5 schematically illustrates network slices of the core network according to various embodiments.

FIG. 5 illustrates aspects with respect to network slicing. In particular, FIG. 5 illustrates aspects with respect to slicing of the core network 113. In further examples, slicing may be employed, alternatively or additionally, for the RAN 114.

In the example of FIG. 5, network slices 151-153 of the core network 113 are defined. It is possible that each UE 130 is associated with a particular network slice 151-153. For example, each UE 130 may be associated with a slice identity. The slice identity may be indicative of a particular one of the network slices 151-153. Then, when initializing the connection with the network 113, based on the slice identity signaling to and from the UE 130 is routed towards the respective network slice 151-153.

In the various examples described herein it is possible to implement access barring based on the slice identity. As such, a control parameter used for access barring may include the slice identity.

Figure 6:
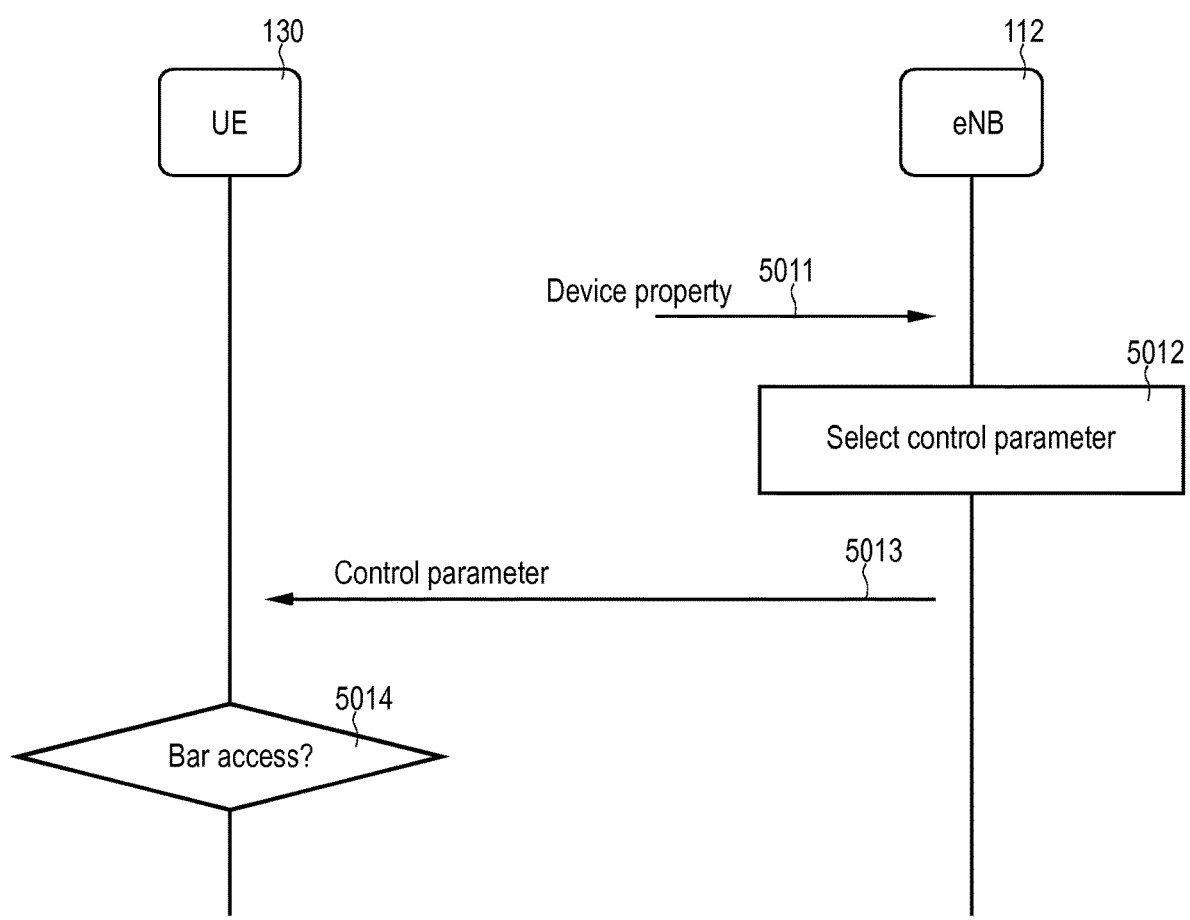
FIG. 6 is a signaling diagram schematically illustrating communication of a control parameter enabling access barring according to various embodiments.

FIG. 6 illustrates aspects with respect to a control parameter 5013. In the example of FIG. 6, the control parameter is transmitted from the network 100, in particular from the eNB 112, to the UE 130. The control parameter is used for selectively barring access of the terminal 130 to the network 100. As such, the control parameter may form the decision basis for selectively barring access.

According to the various examples described herein, the control parameter may be network-defined in the network 100. In the example of FIG. 6, at block 5012, the control parameter is selected by the eNB 112. However, according to various examples, it is also possible that the logic for selecting the control parameter 5013 does not reside at the eNB 112, but rather at another network node, e.g., the MME 116 or the HSS 115.

In the various examples described herein, different decision criteria for selecting the control parameter 5013 at block 5012 are conceivable. For example, according to the implementation of FIG. 6, the control parameter 5013 is selected at block 5012 based on the device property 5011 of the UE 130. In some examples, it is possible that the device property 5011 is signaled by the UE 130 and then received by the eNB 112. In other words, it is possible that the UE 130 reports on the device property 5011 to the network 100. For example, the UE 130 may transmit an indicator indicative of the device property to the network 100 prior to receiving the control parameter 5013 from the network 100. In further examples, the device property 5011 may be retrieved from another entity than the UE 130. For example, the device property 5011 may be retrieved from a network node such as the HSS 115 and/or MME 116.

According to the various examples, different device properties 5011 can be taken into account when determining the control parameter at block 5012. Examples include a communication capability of the UE 130; the device type of the UE 130; the network slice 151-153 associated with the UE 130; an access class of the UE 130; and an operator of a subscriber associated with the UE 130.

For example, the communication capability may define support of certain communication protocols such as 2G, 3G, 4G, upcoming 5G, NB-IOT, etc. For example, the communication capability may define supported frequency bands.

Thus, depending on the particular implementation, the device property 5011 may vary. Then, likewise, the particular selection mechanism used for determining the control parameter at block 5012 may vary accordingly.

Once the control parameter 5013 has been received by the UE 130, it is possible that in block 5014 the UE 130 selectively bars access of the UE 130 to the network for a subsequent connection based on the control parameter 5013 (cf. FIG. 2).

For example, the control parameter 5013 may include a dynamic identity of the UE 130 uniquely/unambiguously assigned to the UE 130. Hence, the dynamic identity cannot be fixedly assigned by hardcoding the identity into the SIM. For example, the dynamic identity may be network-defined. For example, the identity may have a certain lifetime. After the lifetime, the validity of the identity may expire. For example, the lifetime may be implemented by a number of uses, e.g., for one-time use. For example, the lifetime may be implemented by a validity until re-assignment. For example, the lifetime may be implemented by a timer. Then, the dynamic identity may be re-assigned, e.g., to another UE.

Then, by using an appropriate barring policy, taking into account the previously assigned dynamic identity of the UE 130, it is possible to selectively bar or unbar access of the UE 130 to the network 100. In one example, it may be possible that the dynamic identity of the UE 130 is the C-RNTI (cf. FIG. 2: 5005). Here, it is possible that the control parameter 5013 is communicated from the network 100 to the UE 130 during initialization of the respective connection, e.g., during random access procedure. This enables to re-use the C-RNTI which is anyway transmitted as part of the random access.

In a further example, the control parameter 5013 may be implemented by an identity of the network slice 151-153 with which the UE 130 is associated.

Such techniques enable to use different control parameters 5013—and hence different access barring—for different network operators and/or network slices and/or device types, etc. Furthermore, it is also possible to dynamically change the control parameter 5013 as required. For example, if it is observed that the certain UE 130 is making very frequent access attempts, a specific control parameter 5012 may be determined for that UE 130 and signaled to that UE 130, to follow up attempts to initialize the connection.

Generally, such techniques as described herein can be applied for per-UE access barring which individually bars or unbars access of a certain UE 130. However, alternatively or additionally, such techniques as described herein can also be implemented for ACB which bars or unbars access for a class of UEs 130.

Figure 7:
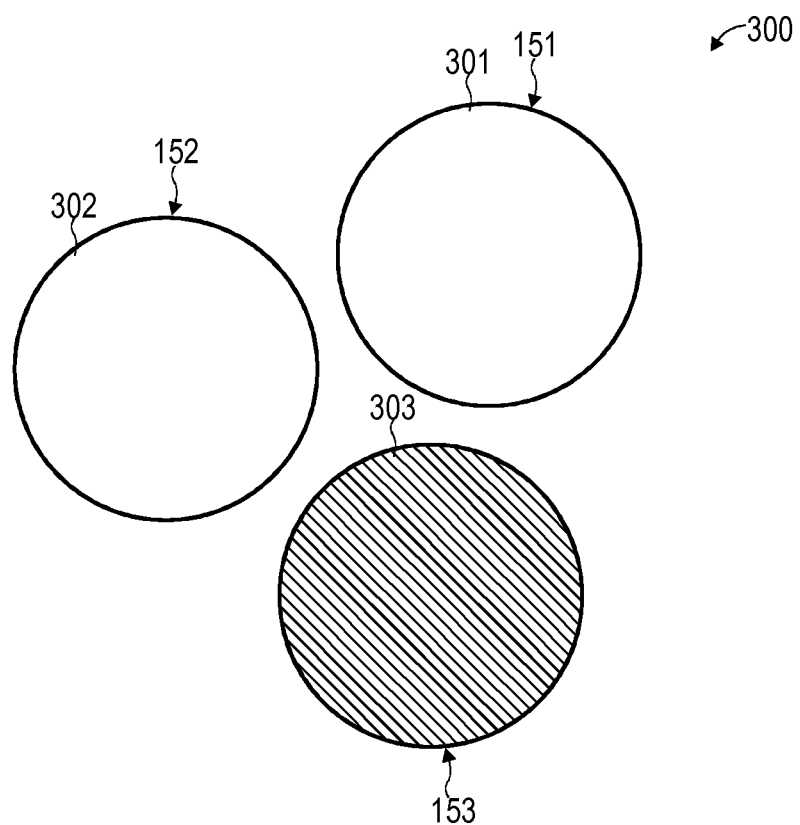
FIG. 7 schematically illustrates a deterministic barring policy defined with respect to multiple classes of control parameters associated with different network slices according to various embodiments.

FIG. 7 illustrates aspects with respect to the ACB. In detail, FIG. 7 illustrates aspects with respect to a barring policy 300. In the example of FIG. 7, the control parameters 5013 assigned to different UEs 130 are grouped into classes 301-303. For example, the class 301 is associated with the network slice 151. As such, all control parameters 5013—e.g., corresponding to the identity of the network slice and/or a unique identity of the UEs 130—associated with the network slice 151 are assigned to the class 301. Likewise, the class 302 corresponds to the network slice 152; and the class 303 corresponds to the network slice 153.

In some examples, the network node in charge of assigning the control parameter may identify the network slice 151-153 associated with a given UE 130 based on a respective device property of the given UE 130. Then the UE may select the appropriate class 301-303. Each class 301-303 may include more than a single member, i.e., may include a space of control parameters that are uniquely associated with the respective class 301-303. Then, the network node may select the specific control parameter from the selected class 301-303 which is associated with the respective network slice 151-153 of the terminal. Such techniques may also be employed for other types and kinds of classified control parameters. Such techniques facilitate dynamic ACB.

In the example of FIG. 7, the barring policy 300 specifies that access is allowed for all UEs having control parameters 5013 associated with the classes 301, 302. The barring policy 300 further specifies that access of the UEs 130 having control parameters 5013 associated with the class 303 are barred from access to the network 100 (indicated by the dashed filling in FIG. 7). One example could be to bar access of all smart meters belonging to a certain electric provider—associated with the network slice 153—while allowing access to the network for all smart meters belonging to a certain gas provider—associated with the network slices 151, 152.

In the scenario of FIG. 7, it is possible that the barring policy 300 communicated to the UEs 130 is not explicitly indicative of all control parameters 5013 which are barred from access to the network 100. This may be in particular helpful if the control parameters are uniquely assigned to the UEs 130—because, otherwise, a long list of control parameters might be required to be transmitted to the UEs 130. Rather, the barring policy 300 may be indicative of all barred control parameters 5013 in a parametrized manner which enables the UEs 130 to conclude back whether its unique and individual control parameter 5013 is actually barred from access or not. This may include some processing of the barring policy 300 and/or the control parameter 5013. In other words, it is possible that the barring policy is indicative of a class of control parameters 5013 for which access to the network 100 is to be barred. One example of such parameterized indication would be to use a modulus function. For example, the UE 130 could calculate a dynamic access class—indicated by the barring policy—by performing modulus (10) on a stored unique identifier such as the C-RNTI. Using a compressed/parameterized form of the barring policy may reduce signaling overhead.

Generally, in the various examples described herein, it would be possible to bar access of the terminal based on a plurality of control parameters. This may be referred to as multi-layered barring, because multiple criteria have to be checked when deciding on whether to bar or not to bar. For example, the access barring could be implemented based on a combination of temporary identities assigned by the network. For example, a certain slice 151-153 could be defined as including potentially barred UEs. Then, all UEs connected to that certain slice and having C-RNTI modulus (10)=0 could be barred.

Generally, it is possible that the barring policy 300 deterministically specifies whether a certain UE 130 is barred from access to the network 100 or not. Alternatively or additionally, it would also be possible to use probabilities. For example, different access classes can be associated with a certain statistical likelihood to become barred. Such a scenario is illustrated in FIG. 8.

Figure 8:
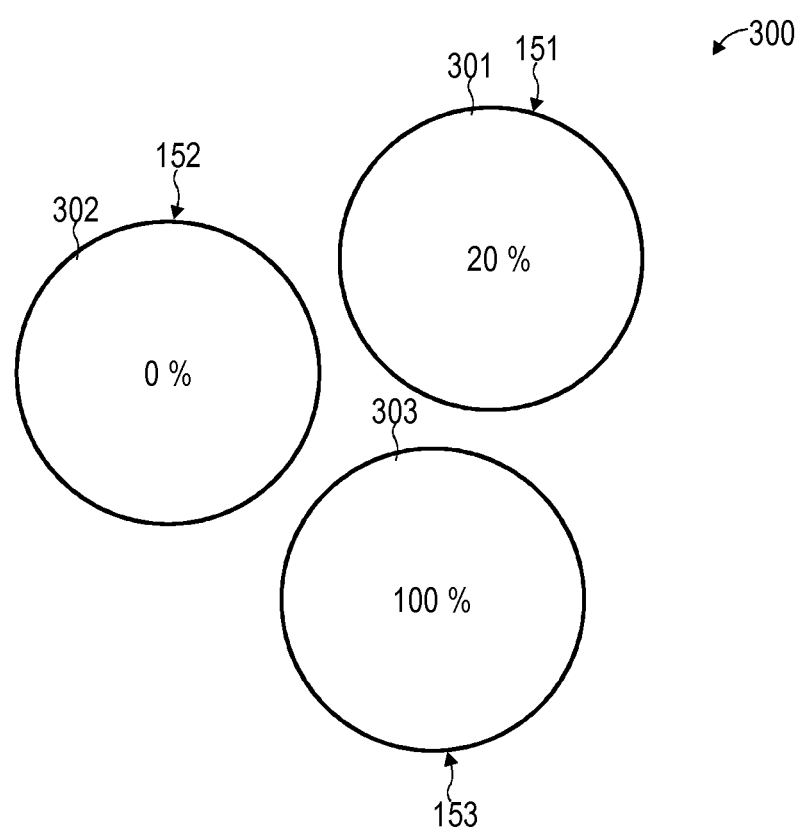
FIG. 8 schematically illustrates a barring policy defined with respect to multiple classes of control parameters associated with different network slices according to various embodiments, wherein the barring policy defines probabilities for barring access of a UE associated with a certain class.

FIG. 8 illustrates aspects with respect to the barring policy 300. The scenario of FIG. 8 generally corresponds to the scenario of FIG. 7. However, instead of deterministically barring certain classes 301-303, the barring policy 300 according to the example of FIG. 8 includes likelihoods for barring the UEs 130 having associated control data falling within the respective classes 301-303.

For example, the class 301 is associated with a 20% chance of being barred. I.e., based on a certain random contribution, a UE 130 having a control parameter 5013 residing in the class 301 is barred or not barred from access to the network 100. Differently, the likelihood of being barred equals 0% for UEs having a control parameter 5013 residing within the class 302. The likelihood for being barred amounts to 100% for UEs 130 having a control parameter 5013 residing within the class 303.

In the various examples described herein, the barring policy 300 may be transmitted using control signaling. The control signaling may be layer 1 or layer 2 or layer 3 signaling in the OSI layer model. For example, the barring policy 300 may be transmitted using a barring bitmap. The barring bitmap may specify individual barring information for each control data and/or for classes of control data.

Figure 9:
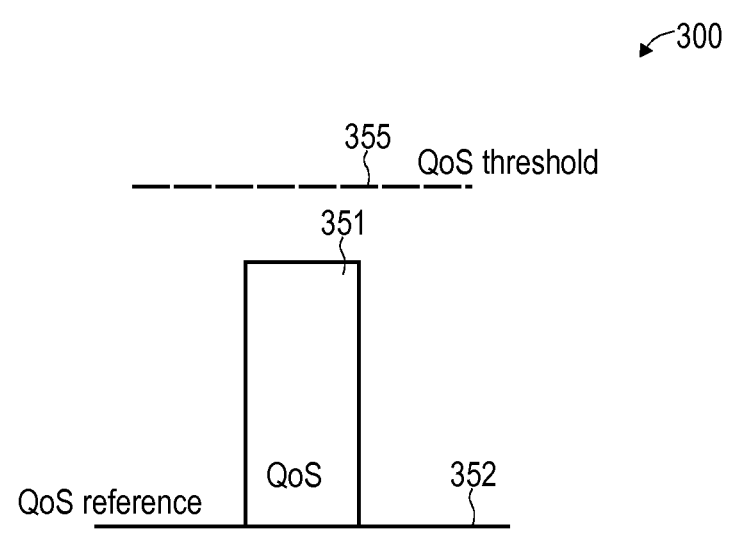
FIG. 9 schematically illustrates a barring policy defining a quality of service threshold according to various embodiments.

FIG. 9 illustrates aspects with respect to the barring policy 300. In particular, FIG. 9 illustrates aspects with respect to the barring policy 300 defining a quality of service (QoS) threshold 355 (horizontal dashed line in FIG. 9).

FIG. 9 further illustrates a quality of service 351 associated with the service for which the respective UE 130 seeks to initialize the connection with the network 100. For example, the service may be defined on an application layer of the OSI layer model. For example, the service may be associated with certain payload data. For example, the service may relate to music streaming, voice call, Internet, packet data network connection, etc.

Furthermore, illustrated in FIG. 9 is a QoS reference 352. As is apparent from FIG. 9, the QoS 351 of the service—defined with respect to the QoS reference 352—remains below the QoS threshold 355. Such a scenario could correspond to barring access of the UE 130 to the network 100. Differently, if the QoS 351—defined with respect to the QoS reference 352—was to exceed the QoS threshold 355 defined by the barring policy 300, this may relate to not barring access to the network 100.

In some examples, it would be possible that the QoS reference 352 is derived from the control parameter 5013. For example, it would be possible that the QoS reference 352 is determined differently for different UEs 130, e.g., based on the unique control parameter 5013. For example, it would be possible that the QoS reference 352 is determined differently for different network slices 151-153 associated with the UEs 130.

In one example, it would be possible to use the C-RNTI as a unique identity of the UE 130 combined with the QoS—e.g., expressed in terms of the 3GPP LTE QoS class identifier (QCI)—in order to enable foreign inter network priority difference, but still use the QoS in the local network. Here, the C-RNTI may define the QoS reference 352. For example, C-RNTI modulus (10)+1=1 combined with the QCI corresponding to the QoS 351 could give a lower number than C-RNTI modulus (10)+1=2 combined with the same QCI value. If the QoS threshold 355 is appropriately specified by the barring policy 300, this enables dynamically changing the priority between different network slices 151-153 by means of the C-RNTI; within each class 301-303 associated with different network slices 151-153, traffic can be prioritized based on the QoS 351. Thus, inter network priorities, as well as intra network priorities can be assigned with respect to the access barring. Such an example may not only be implemented based on the C-RNTI as the unique identity of the UE 130, but may readily be applied with respect to different kinds and types of unique identities of the UEs 130.

In other examples, the control data 5013 may define the threshold 355 and the barring policy may define the QoS reference 352. In any case, the barring policy may specify a QoS requirement.

Figure 10:
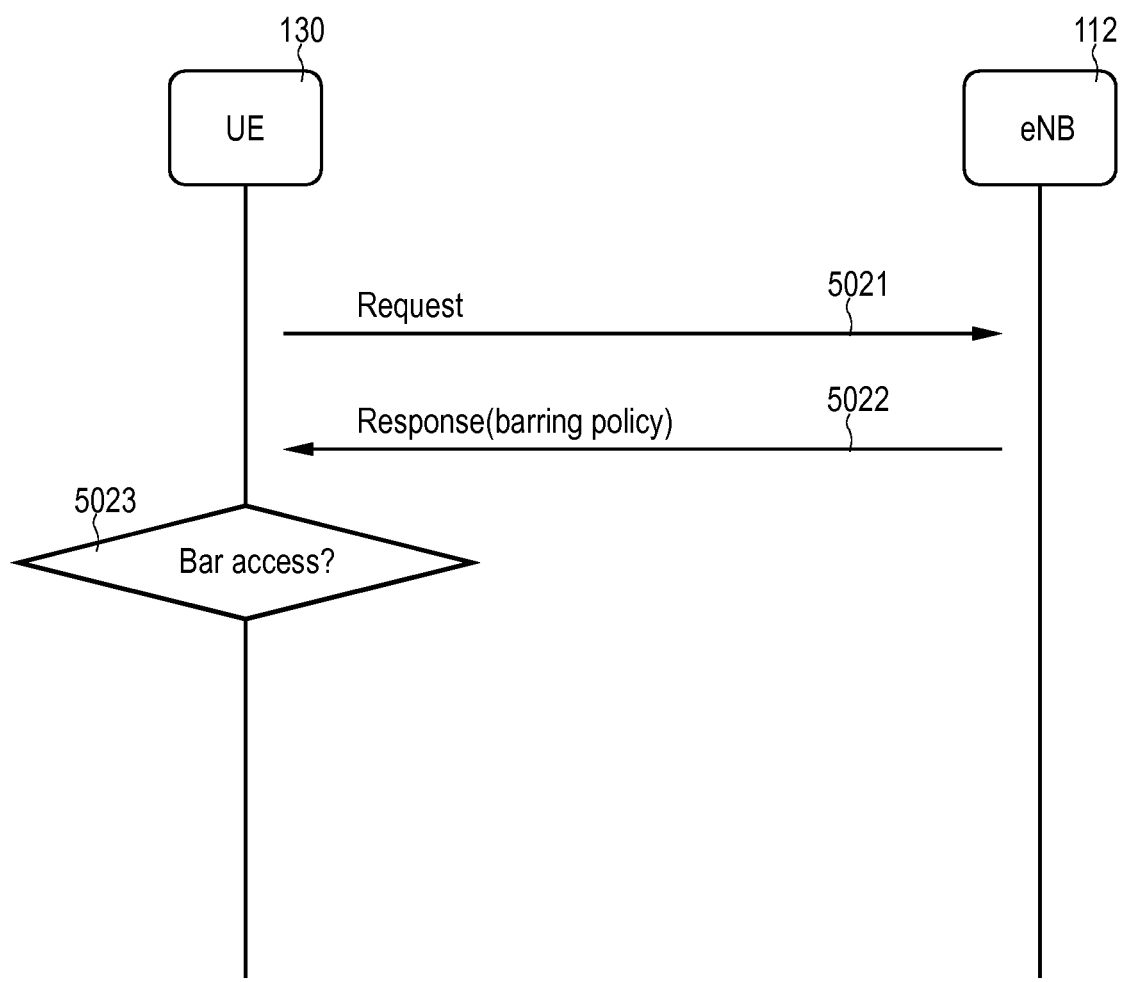
FIG. 10 is a signaling diagram schematically illustrating communication of a barring policy for barring access to the network based on the barring policy according to various embodiments.

FIG. 10 is a signaling diagram. FIG. 10 illustrates aspects with respect to communicating the barring policy 300. In the example of FIG. 10, the UE 130 transmits a request 5021 to the network 100, in particular to the eNB 112. In response to receiving the request, the eNB 112 transmits a response 5022 which is indicative of the barring policy 300. As such, it is possible that the UE 130 is configured to request the barring policy 300 from the network 100.

If compared to scenarios where the barring policy 300 is repeatedly broadcasted, e.g., as part of SIB, such a scenario may help to reduce the control overhead on the wireless link 101. This may be in particular true in a scenario where the barring policy 300 is complex—and thus includes a large data field. In such a scenario it can be more efficient to transmit the barring policy 300 directly to the UE 130 on demand.

Next, at block 5023, the UE 130 checks whether access to the network 100 should be barred. For example, at block 5023, the UE 130 can check for updates in the barring policy 300.

Generally, in the various examples described herein, the dynamic property of the access barring can be implemented by updating the barring policy 300 and/or by updating the control parameter 5013 assigned to a specific UE 130. For example, the network node in charge of assigning the control parameter may monitor a traffic load for a plurality of the network. Then the network node may re-assign a new control parameter to the terminal based on said monitoring. E.g., by re-assigning one or more control parameters of various terminals, a more strict or relaxed barring can be configured. Often, it can be desirable to update the control parameter 5013—e.g., the temporary identity assigned to a specific UE 130—instead of updating the barring policy 300. This can help to reduce the overhead in control signaling on the radio link 101, because typically, the barring policy 300 can have a significant size. Thereby, also a more dedicated access barring functionality can be achieved, since the network 100 can dynamically assign different values of the control parameters, e.g., depending on the up-to-date network slice and/or device properties of a particular UE 130.

Figure 11:
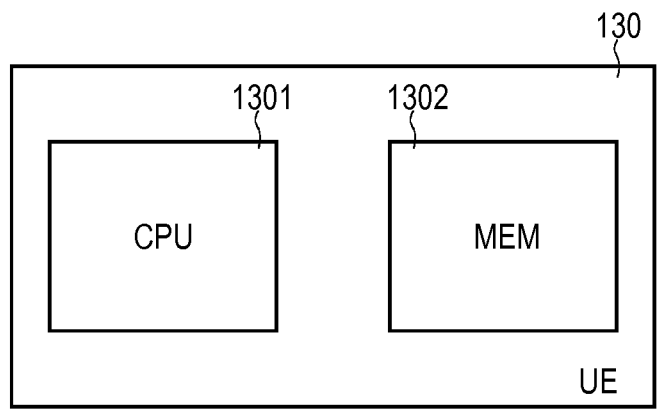
FIG. 11 schematically illustrates a UE according to various embodiments.

FIG. 11 illustrates aspects with respect to the UE 130. The UE includes a processor 1301. The UE further includes a memory 1302. The memory 1302 may be a non-volatile memory. The memory 1302 may store program code. The program code can be executed by the processor 1301. Executing the program code can cause the processor 1301 to perform various techniques described herein, relating to: access barring such as ACB, sending a device property to the network, receiving and storing a control parameter such as a dynamic identity or the identity of a network slice, etc.

Figure 12:
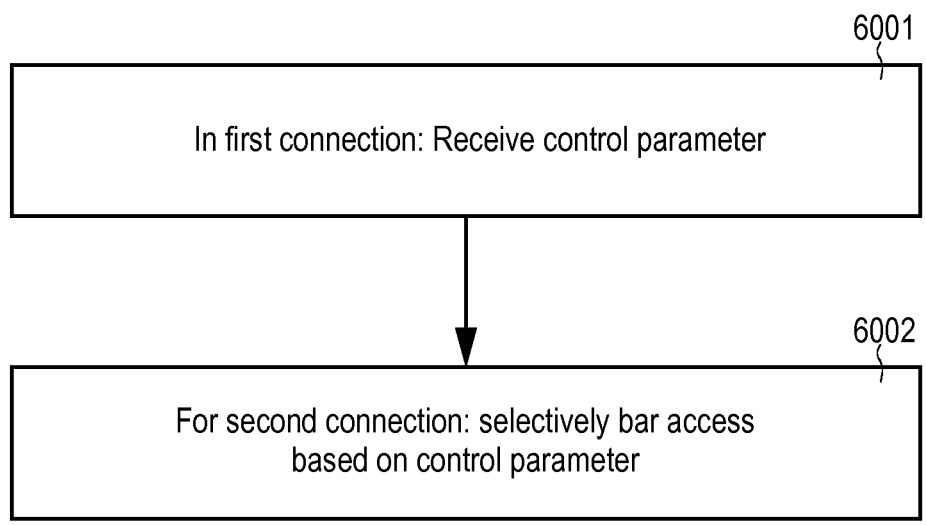
FIG. 12 is a flowchart of a method according to various embodiments.

FIG. 12 is a flowchart of a method according to various examples. For example, the method according to FIG. 12 may be executed by the processor 1301 of the UE 130.

First, in block 6001, a control parameter is received. The control parameter is received in a first connection. For example, the control parameter may be received during initialization of the first connection. Alternatively or additionally, the control parameter may be received after successful establishment of the first connection.

The control parameter may be indicative of the unique identity of the UE. For example, the unique identity may be temporary. It would also be possible that the control parameter is not uniquely assigned to the UE. For example, the control parameter may be indicative of a network slice associated with the UE. Because the network slice may host a plurality of UEs, in such a case, it is not required that the control parameter is uniquely assigned to the UE.

It is then possible to store the control parameter in order to employ the control parameter for access barring later on. For example, in-between blocks 6001 and 6002 a significant amount of time may lapse, e.g., minutes, hours, or days. For example, in-between blocks 6001 and 6002, various changes of the connection state of the UE may take place, e.g., transitions from connected state into disconnected state and/or idle state.

In particular, in block 6002, access to the network is selectively barred for a second connection based on the control parameter. The second connection may be different from the first connection. For example, the access to the network may be selectively barred during or prior to initialization of the second connection. For example, step 6002 may be executed prior to switching from an idle state to a connected state. For example, step 6002 may be executed prior to or during establishment of a bearer such as a default bearer or a dedicated bearer.

Barring access in block 6002 may involve preventing an access attempt or connection request being sent towards the network. Barring access in block 6002 can relate to aborting a connection attempt with the network. In particular, the logic of block 6002 may reside in the UE. Thereby, the load imposed on the network—both in terms of signaling and processing—can be reduced.

Figure 13:
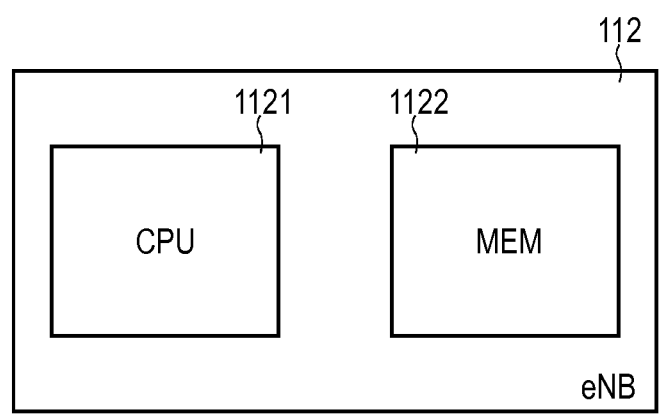
FIG. 13 schematically illustrates a base station according to various embodiments.

FIG. 13 illustrates aspects with respect to the eNB 112. The eNB 112 includes a processor 1121 and a memory 1122. For example, the memory 1122 may be a non-volatile memory. The memory 1122 may store program code. The program code may be executed by the processor 1121. For example, executing the program code can cause the processor 1121 to perform various techniques described herein. Such techniques may include: determining a control parameter for a UE; determining a control parameter for a UE based on a device property of the UE; receiving the device property from the UE and/or a further network node; monitoring a traffic load and configuring access barring based on said monitoring; etc.

With respect to FIG. 13 various aspects have been explained for the eNB 112. However, such techniques may also apply to further network nodes of the network 100 such as the gateways 117, 118 and/or control nodes 115, 116, 119.

Figure 14:
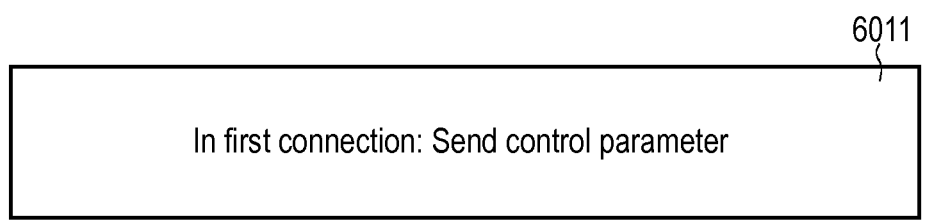
FIG. 14 is a flowchart of a method according to various embodiments.

FIG. 14 is a flowchart of a method according to various examples. It would be possible that the method according to FIG. 14 is executed by the processor 1121 of the eNB 112. Likewise, it would be possible that the method according to FIG. 14 is executed by another network node of the network such as a gateway node or a control node.

In block 6011, a control parameter is sent to a UE. The control parameter is sent to the UE in a first connection. The control parameter enables/facilitates access barring by the UE for a subsequent second connection.

For example, prior to sending the control parameter, the method may also include determining the control parameter. For example, if access barring is implemented as ACB, it would be possible that a class of control parameters is selected based on a device property. For example, the device properties may be grouped within certain classes.

Then, according to said grouping, a particular class may be identified. Each class may have a space of control parameters associated therewith; then, it is possible to select a particular control parameter from the class of control parameters. For example, if the device property indicates a certain network slice associated with the UE, it would be possible to select a class of control parameters associated with this network slice. For example, a certain network slice may have a certain amount of control parameters, each uniquely identifying an associated UE, available. Then, the particular control parameter may be selected from those candidate control parameters defined by the class of control parameters.

In some examples, it is possible to send the control parameter when dynamically updating access barring properties. For example, it is possible that the traffic load for a plurality of network slices is monitored. Then, if the traffic load exceeds a certain threshold, it would be possible to assign new control parameters in order to implement a more strict access barring policy. It would then be possible that the updated control parameters are sent as part of block 6011 to the UEs, e.g., in a push communication. Alternatively or additionally, it would also be possible to update the barring policy based on monitoring the traffic load. Then it would be possible that the updated barring policy is sent as part of block 6011 to the UEs, e.g., in a push communication.

In further examples, the method may further include sending a barring policy to the UEs. The barring policy may specify which control parameters are subject to access barring. For example, it would be again possible to monitor a traffic load for a plurality of network slices. Then, a class of control parameters may be selected based on the monitoring of the traffic load. E.g., a class of control parameters associated with a certain network slice which is to be subject to more restrictive access barring may be selected. Then, once the class of control parameters has been identified, it would be possible to send an updated barring policy to the UE, the barring policy being indicative of the selected class of control parameters for which access to the network is to be barred.

Summarizing, above techniques have been described which enable to implement dynamic access barring. These techniques offer certain advantages over reference implementations of ACB. For example, RAN according to reference implementations typically only has two means of prioritizing/controlling the traffic. One scenario is using traffic filter information such as the QCI. A further scenario is to bar users in case of congestion/traffic overload. It has been observed that the QCI value typically sets a priority of certain traffic types, e.g., voice calls or Internet traffic, within the network. However, since a network slice can be seen as a dedicated network, such a QCI will not provide any inter-network priority. ACB is a means to reduce traffic within the RAN. However, reference implementations of ACB use blind statistical methods. Therefore, according to reference implementations, it is not possible to provide inter-network priority. Furthermore, in a shared RAN—i.e., a RAN used by operators of a plurality of network slices—the RAN will implement ACB with equal priority for each operator.

This is based on the finding that ACB according to reference implementations is based on static and predefined numbers provided to the user when accruing the subscriber identity module. For example, according to reference implementations, access classes 0-9 are distributed evenly amongst devices.

Differently, according to the various examples described herein, it is possible to assign a temporary control parameter by the network to a UE. The control parameter can be used for implementing access barring. Depending on the definition of the control parameter and/or depending on the definition of a corresponding barring policy, it is possible to implement device-specific access barring and/or ACB.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

The invention claimed is:

1. A terminal configured to:
transmit an indicator indicative of a device property of the terminal to a network;
receive, via a wireless link, a control parameter from the network in a first connection with the network, wherein the control parameter is determined based on the device property; and
selectively bar access of the terminal to the network for a subsequent second connection based on the control parameter,
wherein the terminal is configured to transmit the indicator prior to receiving the control parameter from the network,
wherein the terminal is configured to bar the access prior to initialization of the second connection, and
wherein the device property comprises one or more of the following: a device type of the terminal; a network slice of the network associated with the terminal; and a network operator associated with the terminal.

2. The terminal of claim 1,
wherein the second connection comprises a default bearer associated with an IP address of the terminal and/or a dedicated bearer associated with the default bearer.

3. The terminal of claim 1,
wherein the terminal is configured to bar access in an idle state and/or a disconnected state of the terminal.

4. The terminal of claim 1,
wherein the control parameter further comprises an identity of a network slice of the network associated with the terminal.

5. The terminal of claim 1,
wherein the control parameter comprises the Cell Radio Network Temporary Identity (C-RNTI).

6. The terminal of claim 1,
wherein the terminal is configured to receive the control parameter during initialization of the first connection.

7. The terminal of claim 1,
wherein the terminal is configured to receive a barring policy from the network,
wherein the terminal is configured to bar the access further based on the barring policy.

8. The terminal of claim 7,
wherein the barring policy comprises a quality of service requirement,
wherein the terminal is configured to bar the access further based on a comparison of the quality of service requirement with the quality of service of the second connection.

9. The terminal of claim 7,
wherein the terminal is configured to request the barring policy from the network.

10. The terminal of claim 7,
wherein the barring policy is indicative of a class of control parameters for which access to the network is to be barred.

11. The terminal of claim 1, wherein the control parameter further comprises a dynamic identity uniquely assigned to the terminal by the network.

12. The terminal of claim 11, wherein the terminal is further configured to abort establishing the subsequent second connection when it is determined access to the network is barred based on the control parameter.

13. The terminal of claim 11, wherein the dynamic identity has an associated lifetime after which a validity of the dynamic identity, as assigned to the terminal, expires.

14. The terminal of claim 11, wherein the terminal is further configured to selectively bar access of the terminal to the network for a subsequent second connection taking into account the previously assigned dynamic identity.

15. A network node of a network configured to send, via a wireless link, a control parameter to a terminal in a first connection with the terminal, the control parameter enabling access barring by the terminal to the network for a subsequent second connection,
wherein the terminal is configured to bar the access prior to initialization of the second connection,
wherein the network node is configured to receive a device property of the terminal,
wherein the network node is configured to determine the control parameter based on the device property, and
wherein the device property is indicative of elements selected from the group comprising: a device type of the terminal; a network slice of the network associated with the terminal; and a network operator associated with the terminal.

16. The network node of claim 15,
wherein the network node is configured to select a class of control parameters based on the device property,
wherein the network node is configured to select the control parameter from the class.

17. The network node of claim 15,
wherein the network node is configured to monitor a traffic load of the network,
wherein the network node is configured to re-assign a new control parameter to the terminal based on said monitoring of the traffic load.

18. A method for a terminal, comprising:
transmitting an indicator indicative of a device property of the terminal to a network,
receiving a control parameter from the network in a first connection between the terminal and the network, wherein the control parameter is determined based on the device property, and
selectively barring access to the network for a subsequent second connection between the terminal and the network based on the control parameter,
wherein the transmitting of the indicator is prior to receiving the control parameter from the network,
wherein the barring access is prior to initialization of the second connection, and
wherein the device property comprises one or more of the following: a device type of the terminal; a network slice of the network associated with the terminal; and a network operator associated with the terminal.

19. A method, comprising:
receiving a device property of a terminal,
determining a control parameter based on the device property, and
sending the control parameter to the terminal in a first connection with the terminal, the control parameter enabling access barring by the terminal to a network for a subsequent second connection prior to initialization of the second connection,
wherein the device property is indicative of elements selected from the group comprising: a device type of the terminal; a network slice of the network associated with the terminal; and a network operator associated with the terminal.

* * * * *